(12) United States Patent
Mach et al.

(10) Patent No.: US 10,524,482 B2
(45) Date of Patent: Jan. 7, 2020

(54) METHOD OF EQUIPPING A FILLING TUBE AND APPARATUS FOR FILLING TUBULAR CASES

(71) Applicant: VEMAG Maschinenbau GmbH, Verden/Aller (DE)

(72) Inventors: Matthias Mach, Hannover (DE); Jan-Nils Hagedorn, Verden (DE); Heiner Matthies, Kalbe (DE); Olaf Grote, Eystrup (DE); Alexander Lewin, Verden (DE)

(73) Assignee: VEMAG Maschinenbau GmbH, Verden/Aller (DE)

( * ) Notice: Subject to any disclaimer, the term of this patent is extended or adjusted under 35 U.S.C. 154(b) by 0 days.

(21) Appl. No.: 16/403,951

(22) Filed: May 6, 2019

(65) Prior Publication Data

US 2019/0335768 A1    Nov. 7, 2019

(30) Foreign Application Priority Data

May 7, 2018   (DE) .......................... 10 2018 110 888

(51) Int. Cl.
*A22C 11/00*    (2006.01)
*A22C 11/02*    (2006.01)

(52) U.S. Cl.
CPC ...... *A22C 11/0227* (2013.01); *A22C 11/0245* (2013.01); *A22C 11/0263* (2013.01)

(58) Field of Classification Search
CPC ....... A22C 11/00; A22C 11/008; A22C 11/02; A22C 11/0209; A22C 11/027; A22C 11/0236

(Continued)

(56) References Cited

U.S. PATENT DOCUMENTS 7,666,071 B2    2/2010  Nakamura et al.
2004/0038635 A1  2/2004  Sawhill et al.
(Continued)

FOREIGN PATENT DOCUMENTS

DE    102008026095 A1   12/2008
EP       0962143 A1    12/1999
(Continued)

OTHER PUBLICATIONS

European Patent Office, Extended Search Report issued in EP 19172385.7-1011 dated Oct. 14, 2019 (6 pages).

*Primary Examiner* — Richard T Price, Jr.
(74) *Attorney, Agent, or Firm* — Wood Herron & Evans LLP

(57) ABSTRACT

A method is provided for equipping at least one filling tube of an apparatus for filling tubular cases with a gathered tubular case. The method includes opening at least one gripping element of a case gripping device, feeding a gathered tubular case into a region of the at least one gripping element of the case gripping device, and closing at least one gripping element for fixing and axially centering the case. The method also includes moving the filling tube and the gripping device relative to each other towards each other for introducing the filling tube into an interior space of the case, partially opening at least one gripping element, and moving the filling tube and the gripping device relative to each other towards each other, such that the filling tube entrains the case and the case is guided by the gripping elements.

18 Claims, 11 Drawing Sheets

(58) Field of Classification Search
USPC .............. 452/30–32, 35–37, 46–48, 51
See application file for complete search history.

(56) References Cited

U.S. PATENT DOCUMENTS

| | | | | |
|---|---|---|---|---|
| 2010/0330891 | A1* | 12/2010 | Baechtle | A22C 11/0218 |
| | | | | 452/36 |
| 2014/0127985 | A1* | 5/2014 | Ebert | A22C 11/02 |
| | | | | 452/35 |
| 2015/0245627 | A1* | 9/2015 | Krompholz | A22C 11/0209 |
| | | | | 452/40 |

FOREIGN PATENT DOCUMENTS

| | | | |
|---|---|---|---|
| EP | 1750517 | B1 | 9/2009 |
| EP | 2384634 | A2 | 11/2011 |
| EP | 3449727 | A1 | 3/2019 |

* cited by examiner

METHOD OF EQUIPPING A FILLING TUBE AND APPARATUS FOR FILLING TUBULAR CASES

CROSS-REFERENCE TO RELATED APPLICATION

This application claims priority to German Application No. 10 2018 110 888.5, filed May 7, 2018. The above-mentioned patent application is incorporated herein by reference in its entirety.

TECHNICAL FIELD

The invention relates to a method and apparatus for processing foodstuffs, in particular meat products, and more particularly, relates to a method and apparatus for filling tubular cases with foodstuffs.

BACKGROUND

Some methods, apparatuses and systems for equipping a filling tube and for filling tubular cases are known in conventional art. For example, apparatuses are previously known for industrial sausage production, in which a tubular case to be filled is applied to a filling tube in an automated procedure in a gathered state, also referred to as a gathered sausage skin casing or shirred sausage skin. Sausage meat then issues at the open end of the filling tube and is delivered into the tubular case which has been applied to the filling tube.

By portion-wise closure of the cases, for example by portion-wise twisting of individual filled case portions relative to each other or by other measures, the continuous line of cases is separated into individual sausages after having been filled with sausage meat.

To accelerate the production process the state of the art discloses filling apparatuses in which a plurality of and in particular two filling tubes are arranged on a main body which is rotatable parallel to the longitudinal axis of the filling tube and which has a receiving portion, the receiving portion being rotatable in a rotary turret-like fashion together with the filling tubes. By such an arrangement, the filling tube is equipped with a gathered tubular case and the actual case filling operation is performed in different operating positions.

The step of applying the gathered tubular case to the filling tube in a so-called equipping position is further automated in apparatuses which are previously known. Thus it is previously known in particular for the gathered tubular cases to be removed from a magazine by magazine sliders and then positioned by the grippers in front of the filling tube in such a way that the case can be pushed on to the filling tube, in particular by a pushing-on member.

After the sausage skin casing has been pushed on to the filling tube the latter is rotated into a filling position. Filling of the gathered tubular cases is effected in that filling position.

The apparatuses and equipping methods previously known make it possible to apply gathered tubular cases to filling tubes in an automated procedure. It has been observed however that, in relation to gripper-assisted equipping of the filling tube, damage can occur to the gathered tubular cases, in particular at the junctions thereof, also referred to as pushback. It has also been found that the arrangement of two or more filling tubes in the above-described manner is not required nor advantageous for every production application.

It would be desirable, therefore, to provide a method of equipping a filling tube and an apparatus for filling tubular cases, which ensure a careful equipping procedure for fitting a gathered tubular case on to a filling tube. It would also be desirable to provide the apparatus to be of a compact and low-maintenance nature.

SUMMARY

These and other technical objectives are achieved, in one embodiment, by providing a method of equipping at least one filling tube of an apparatus for filling tubular cases with a gathered tubular case. The method includes opening at least one gripping element of a case gripping device, feeding a gathered tubular case into a region of the at least one gripping element of the case gripping device, closing at least one gripping element for fixing and axially centering the case along a longitudinal axis of a filling tube.

In another embodiment, an apparatus for filling tubular cases includes a feed device for feeding a gathered tubular case to a case gripping device, a case gripping device having gripping elements which are moveable relative to each other for gripping and orienting a gathered tubular case relative to a centering axis, and a filling tube adapted to receive the gathered tubular case, for delivery of a pasty material. A system for filling gathered tubular cases is also provided.

The method of equipping a filling tube includes the following steps, in another embodiment: moving the filling tube and/or the gripping device relative to each other towards each other for introducing the filling tube into an interior space of the case, partially opening at least one gripping element, and moving the filling tube and/or the gripping device relative to each other towards each other. The filling tube entrains the case in the direction of movement of the filling tube and the case is guided by the gripping elements.

It has proven to be advantageous for the filling tube to be firstly at least partially introduced into the case interior with the gripping elements closed, in which case the case is held by the gripping elements and at any event axial displaceability of the case is prevented. The case is then centered both by the grippers and also by the filling tube. Subsequently implemented partial opening of the gripping elements enables axial mobility of the case, wherein in a further movement of the filling tube and/or the gripping device towards each other the case is guided by the gripping elements. That has proven to be suitable for reducing damage to the gathered tubular cases in the procedure for fitting the case to the filling tube.

According to a first alternative embodiment, the filling tube is moved axially relative to an axially stationary gripping device. In a second alternative embodiment the gripping device is moved relative to an axially stationary filling tube.

In one aspect, the degree of penetration of the filling tube into the case interior can be flexibly selected and in particular adapted to the case length and the dimensions of the filling tube, for example the filling tube length or the filling tube diameter.

In another aspect, the operation of introducing the filling tube into the case interior is effected until the filling tube comes into contact with an end portion of the case. In that case the end portion of the case has a closure which for example can be in the form of a knot or plug. In other words the filling tube is preferably introduced into the case interior with the gripping elements closed, as far as the closure which is in the end portion.

In a further aspect, the further continuation of the relative movement with the gripping elements closed is avoided in order to avoid damage to the closure or damage to the case in the region of the closure.

In yet another aspect, the filling tube is only partially introduced into the case interior. That arrangement has proven to be advantageous in order to provide for centering of the case on the filling tube, admittedly basically by partial penetration of the filling tube into the case, but in order to prevent damage to the case which could occur by virtue of the pressure of the gripping elements against the case upon further displacement of the filling tube.

The method may also include axially moving the filling tube and/or a casing brake into a filling position in which the end portion of the case comes into contact with the casing brake.

For an embodiment in which the filling tube is arranged axially moveably, the axial movement of the filling tube into the filling position implements further pushing movement of the case on to the filling tube, for the situation where that was not yet completely put on to the filling tube. In that case the case is firstly entrained by the filling tube with the gripping elements slightly opened, by virtue of the axial movement of the filling tube, and is axially guided by the gripping elements. If the case now encounters an abutment formed by the casing brake then further axial movement of the filling tube in the direction of the casing brake provides that the case is impeded in its axial movement by the casing brake and thus further displacement of the filling tube in the direction of the casing brake has the consequence that the filling tube penetrates further into the case interior, more specifically until the filling tube has reached the filling position.

For the situation where the case was already completely placed on the filling tube then upon axial movement of the filling tube in the direction of the casing brake there is a movement of the case in the direction of the filling position, being guided both by the filling tube itself and also by the slightly opened gripping elements.

In some embodiments, the method further includes filling the case, in particular with a pasty material, and opening at least one gripping element, in particular continuously or step-wise. In that respect it is preferred that, after in particular complete filling of the case—in which case after complete processing of the case there are typically no residues thereof remaining on the filling tube—opening of at least one gripping element takes place and the method can then be implemented afresh starting from a first method step.

In one aspect, the method includes ascertaining the diameter of the case, and/or detecting incorrect loading of the gripping elements. By virtue of sensor-based monitoring of the gripping element or elements and monitoring of the forces which occur upon axial displacement of the filling tube and/or the gripping elements, it is possible to ensure that the case is correctly fitted on to the filling tube and also correctly guided by the gripping elements.

If, for example, the forces at the gripping device and/or the forces linked to a relative movement of the filling tube and the gripping device deviate from a normal range then an alarm may be generated and the apparatus may be stopped. In particular for that state in which the gripping elements are closed in such a way that they are in direct contact with the case it is possible to infer the case diameter of the case to be processed, from the position of the gripping elements, whereby it is possible to avoid using inappropriate cases, for example cases which are incompatible with the filling tube diameter.

In another aspect, the method includes additional following movement of the case in the direction of the casing brake during the operation of filling the case. Such axial tracking movement of the case has proven to be advantageous for increasing the filling speed.

In another embodiment, an apparatus for filling tubular cases includes a feed device for feeding a gathered tubular case to a case gripping device, a case gripping device having two gripping elements moveable relative to each other for gripping and orienting a gathered tubular case relative to a centering axis, and a filling tube for the delivery of a pasty material, which is adapted to receive the gathered tubular case.

The filling tube and/or the case gripping device are arranged axially moveably relative to each other, and a control device is adapted to carry out the following steps: moving the filling tube and/or the gripping device relative to each other towards each other for introducing the filling tube into an interior space of the case, partially opening at least one gripping element, and relatively moving the filling tube and/or the gripping device relative to each other towards each other, wherein the filling tube entrains the case in the direction of movement of the filling tube and the case is guided by the gripping elements.

In one aspect, the apparatus has a detecting device for detecting the position of at least one of the gripping elements and/or the axial position of the filling tube and/or the gripping device. It is possible to infer many different conclusions from the position data about operating parameters like for example the case diameter, and it is possible to ensure that the filling tube comes into contact with or is introduced into the case in such a way that damage to an end portion of the case which typically has a knot or junction which is sensitive to damage is avoided.

In another aspect, the detecting device has a force sensor for ascertaining the forces occurring at the gripping elements and/or the filling tube. The control device is also adapted to ascertain the diameter of the cases and/or incorrect loading of the gripping elements. Precise knowledge about forces which are typically to be expected and deviations thereof permits detection of so-called misloading procedures in which a case has been defectively mounted to the filling tube or has been defectively engaged by the gripping elements. An increase for example in the force required for the advance movement of the filling tube makes it possible to conclude that for example a case which by its nature is not always completely straight has tilted for example upon insertion of the filling tube into the case interior. Operation of the filling apparatus can be stopped on the basis of such information.

In a further aspect, the filling tube is mounted rotatably and in particular in a drivable manner. By virtue of the rotation or rotatability of the filling tube the production of individual sausages from a string of cases is made possible in particular insofar as individual case portions are rotated relative to each other, whereby individual compartments are formed in the case and accordingly individual sausages. In an alternative embodiment the filling tube is non-rotatable.

In yet another aspect, the apparatus has a casing brake device. In the case of a rotating filling tube in particular, as described hereinbefore, that serves to provide the individual sausages. If the filling tube is non-rotatable it is further preferred that the casing brake device is rotatable for producing the individual sausages.

In another embodiment, a system for filling gathered tubular cases is provided, including a filling machine for providing a pasty material for an apparatus for filling tubular cases, and an apparatus for filling tubular cases, according to the description above. The system enjoys the same advantages and preferred configurations as the apparatus according to the invention.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitutes a part of this specification, illustrate one or more embodiments of the invention and, together with the general description given above and the detailed description given below, explain the one or more embodiments of the invention.

DETAILED DESCRIPTION

The following clearly and completely describes the technical solutions in the embodiments of the present invention with reference to the accompanying drawings in the embodiments of the present invention. To make objectives, features, and advantages of the present invention clearer, the following describes embodiments of the present invention in more detail with reference to accompanying drawings and specific implementations.

Figure 1:
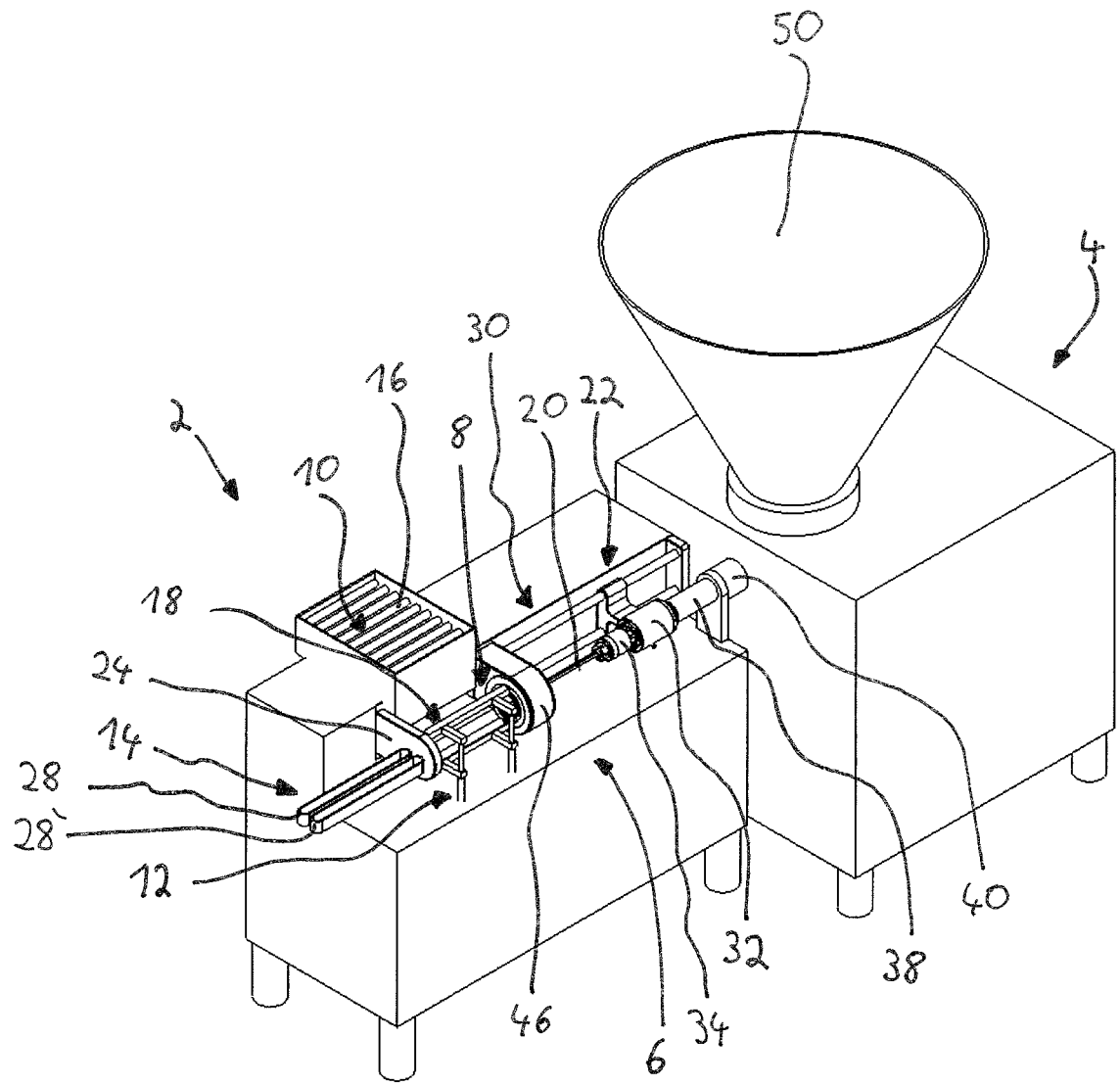
FIG. 1 shows a perspective view of a machine for filling tubular cases according to one embodiment of the invention.

FIG. 1 shows a filling machine 4 for filling tubular cases 16, in particular natural or artificial sausage casings, in conjunction with an attachment 2 with which a filling apparatus 6 and a filling tube equipping apparatus 8 are associated. The machine 4 further has a filling hopper 50 and an extrusion head 40 which is coupled to the filling apparatus 6.

The filling tube equipping apparatus 8 includes a case magazine 10 for accommodating a plurality of tubular cases 16 and a case gripping device 12. In addition arranged at the attachment 2 is a conveyor device 14 having two conveyor elements 28 and 28' which extent at a spacing relative to each other in a horizontal plane. The conveyor device 14 services for transporting the sausages produced by the filling apparatus 6 (not shown in FIG. 1).

The filling apparatus 6 serves to fill the tubular cases 16 by the pasty material supplied by the extrusion head 40. In that respect the extrusion head 40 is connected in fluidic relationship for example by moveable line portion 38 to a filling tube 20. The filling tube 20 is arranged in a filling tube receiving means 34 mounted rotatably in a main body 32. That main body 32 in turn is connected to a filling tube adjusting device 22. The filling tube adjusting device 22 has a guide 30, by which the main body 32 including the filling tube receiving means 34 is moveable axially along a filling tube longitudinal extent.

By the moveable line portion 38 this arrangement provides that, in all positions that the filling tube adjusting device 22 can assume, it is ensured that the pasty material can be made available in fluidic relationship from the extrusion head 40 to the filling tube 20 by way of the filling tube receiving means 34. In addition the filling apparatus 6 has a drive portion 46 which is adapted to come into contact with the filling tube receiving means 34 by way of a first coupling portion 36 (see FIG. 4). A rotational movement generated in the drive portion 46 can be applied in that way to the filling tube receiving means 34 and thus the filling tube 20 when the filling tube 20 is in the filling position in which the filling tube receiving means 34 comes into contact with the drive portion 46, as is still to be described.

The feed device 18 has a case magazine 10 in which cases 16 are arranged. A case 16 is fed from the case magazine 10 to the case gripping device 12. The supplied case 16 can be centered relative to the filling tube 20 by movement of the case gripping device 12. Axial movement of the filling tube 20 in the direction of the case gripping device 12 takes place by virtue of a movement of the filling tube adjusting device 22 in the direction of the drive portion 46. A case 16 which is centered relative to the filling tube 20 can now be fitted on to the filling tube 20 in such a way that the filling tube 20 is moved axially into an internal space in a case 16. In that respect the case gripping device 12 is able both to hold a case 16 in the centered position and also after partial opening of the case gripping device 12, to guide it admittedly axially, but overall allowing axial displaceability of a case 16. A case 16 which has been fitted on to the filling tube 20 can now be advanced towards a casing brake 24. The filling tube 20 can be caused to rotate by the drive portion 46, in which case strings of sausages are produced by the casing brake 24, such strings being further transported by the conveyor device 14.

Figure 2:
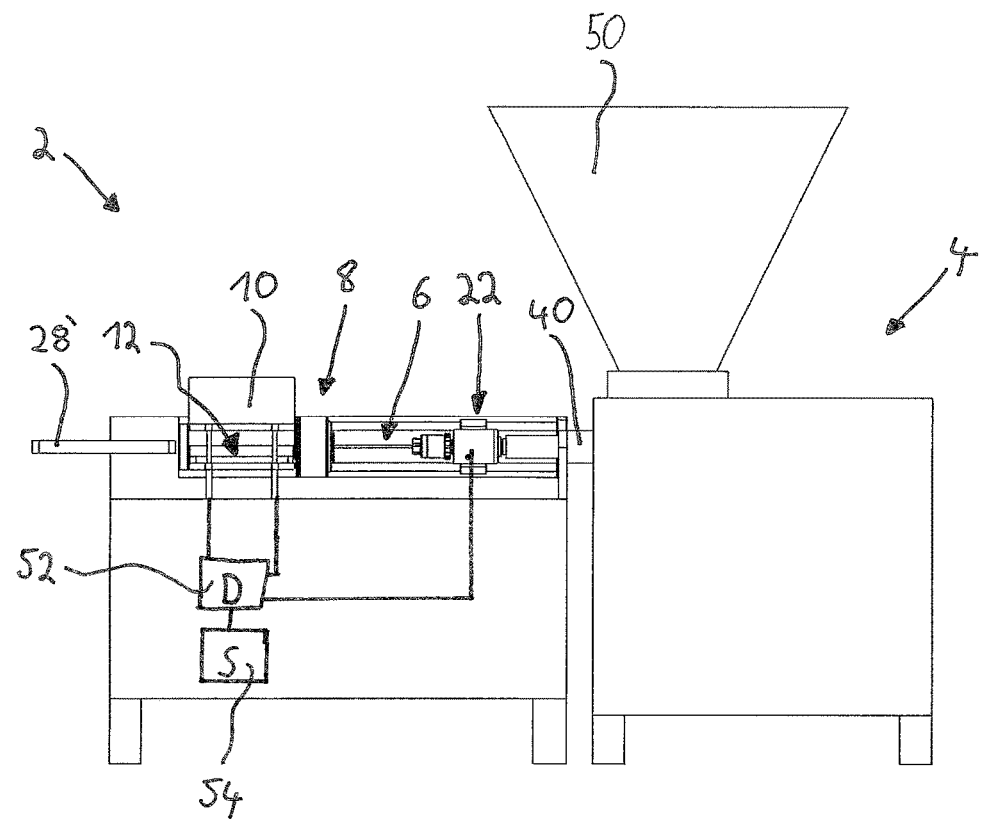
FIG. 2 shows a side view of the filling machine of FIG. 1.
Figure 3:
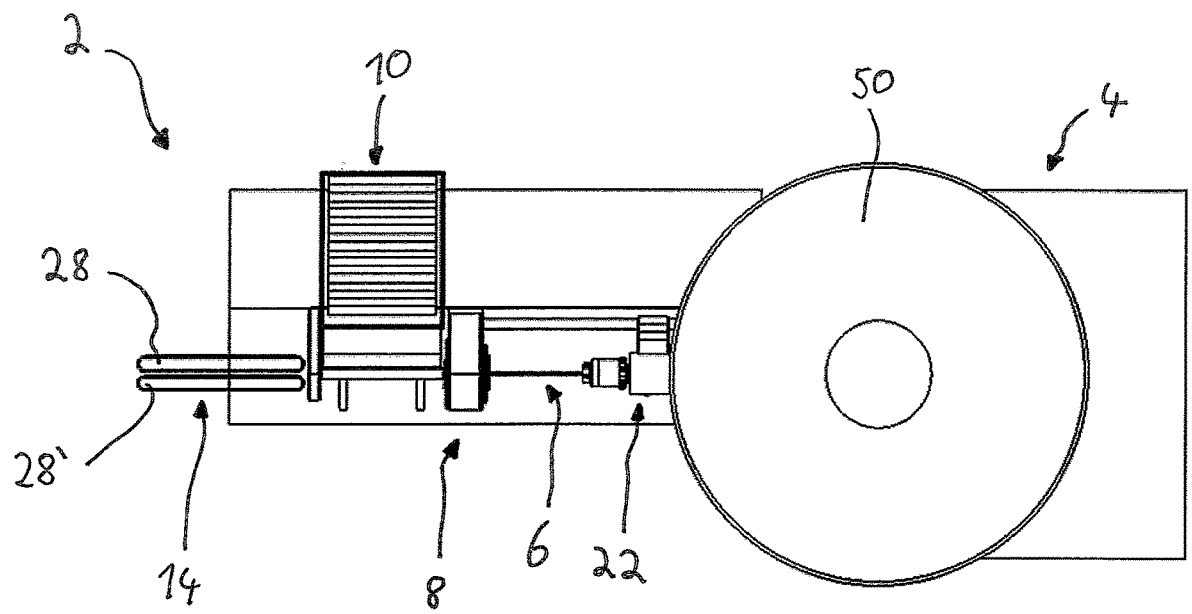
FIG. 3 shows a top plan view of the filling machine of FIG. 1.

Further perspective views of the apparatus just described above can be seen from FIGS. 2 and 3. FIG. 2 also shows a detecting device 52 connected to the case gripping device 12 and the filling tube adjusting device 22. A control device 54 is again connected to the detecting device 52. In that case the control device 54 is also adapted by way of the illustrated connections to influence the case gripping device 12 and the filling tube adjusting device 22.

Figure 4:
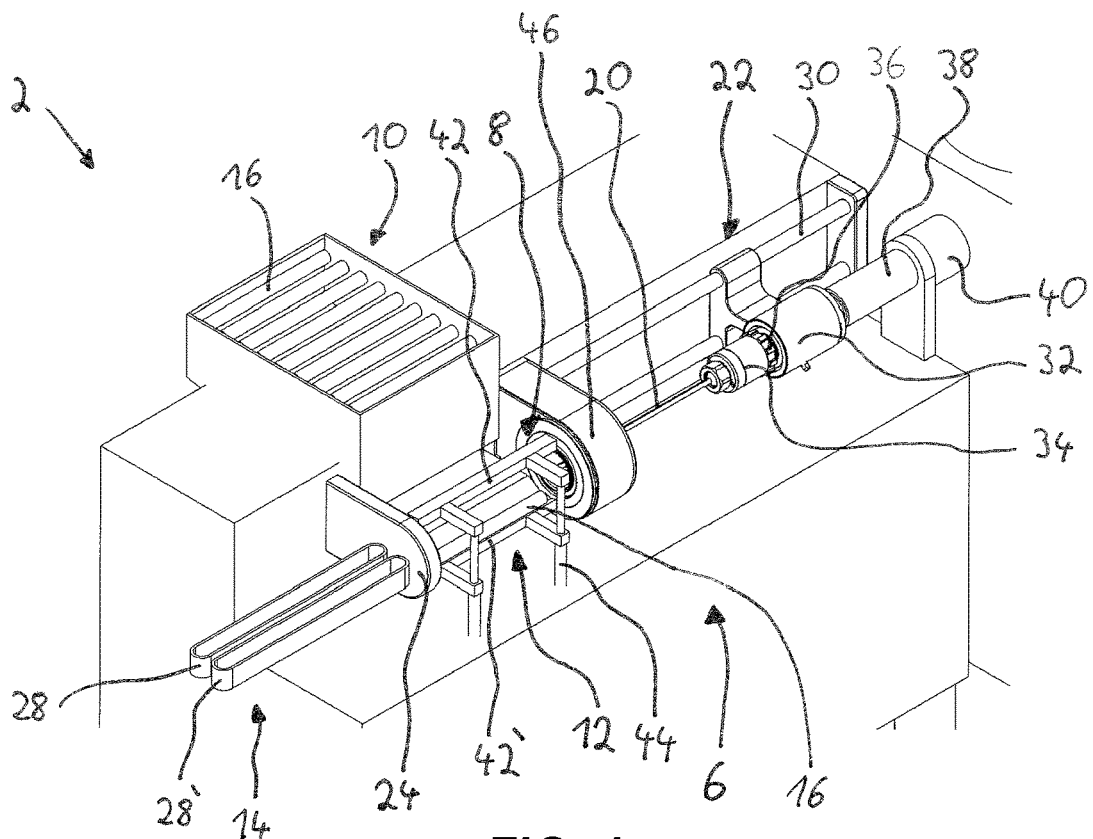
FIG. 4 shows a detailed perspective view showing a portion of the filling machine of FIG. 1 in a first operational position.
Figure 5:
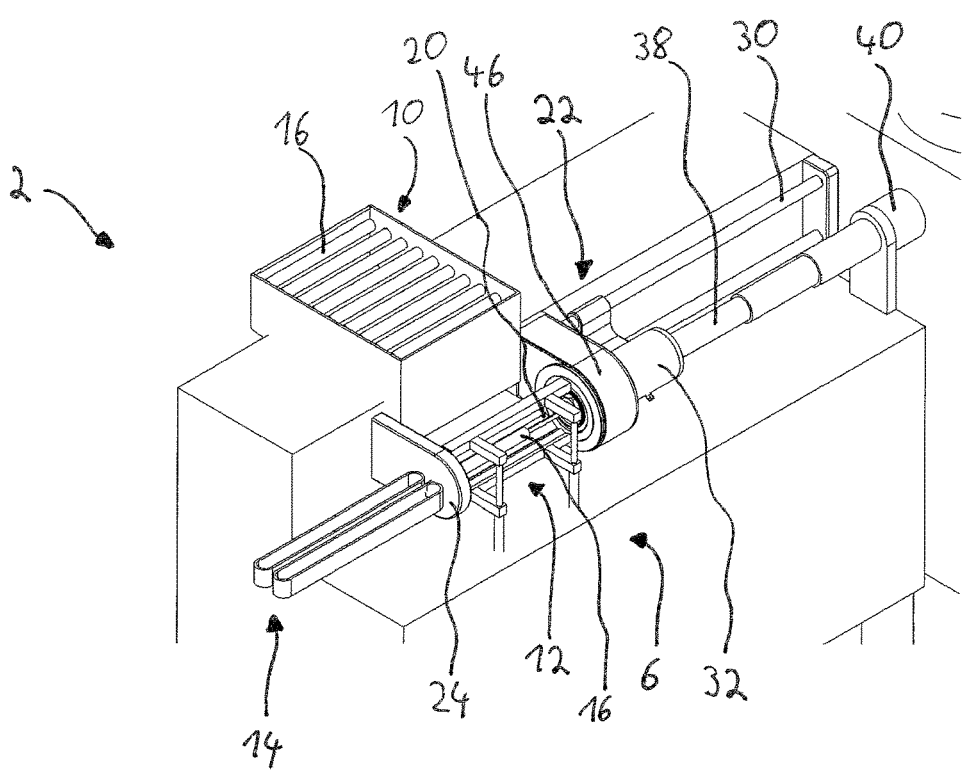
FIG. 5 shows a detailed perspective view showing the filling machine of FIG. 4 in a second operational position configured for filling a casing.

Enlarged perspective views are shown in FIGS. 4 and 5. It can firstly be seen from FIG. 4 that the case gripping device 12 has an upper gripping element 42 and a lower gripping element 42' which are connected and actuated by way of gripper linkages 44. In addition FIG. 4 shows the first coupling portion 36 which can be brought into contact with a second coupling portion 48 (not shown in FIG. 4) of the drive portion 46 in order to cause the filling tube 20 to rotate. In the operating state shown in FIG. 4 a case 16 was fed to the lower gripping element 42'. The filling tube 20 is further disposed in an axial position in which a tip of the filling tube 20 has not yet been moved into a region of the case gripping device 12.

In the state shown in FIG. 5 the case 16 is now on the twisting-off tube 20, wherein the twisting-off tube 20 is further overall disposed in a filling position. In that case the case 16 is in contact with the casing brake 24 and the case 16 can be filled with a pasty material. In addition the case gripping device 12 is in an opened state so that rotation of the filling tube 20 and the case 16 is permitted. In addition the moveable line portion 38 is now in an extended position for producing a fluid-conducting connection between the extrusion head 40 and the filling tube 20. In addition, by virtue of the coupling of the filling tube receiving means 34 (not visible here) to the drive portion 46 a rotary movement can be transmitted from the drive portion 46 to the filling tube 20.

The method steps according to the invention are shown in FIGS. 6A through 13B. The Figures identified with "A" and "B" which each have the same respective Arabic number represent the same operating state, firstly from a perspective view and then from a sectional view.

Figure 6A:
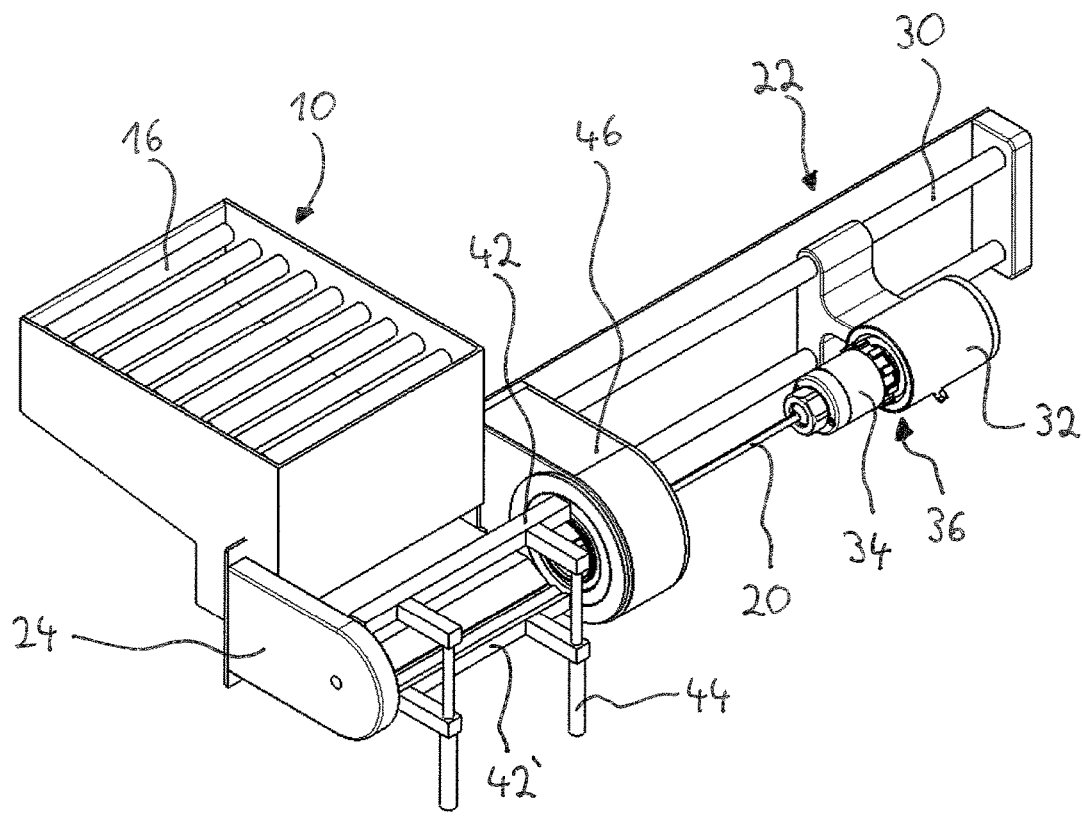
FIG. 6A shows a top perspective view of the filling machine of FIG. 1 in a starting position, in accordance with a first step of a method in accordance with one embodiment of the invention.
Figure 6B:
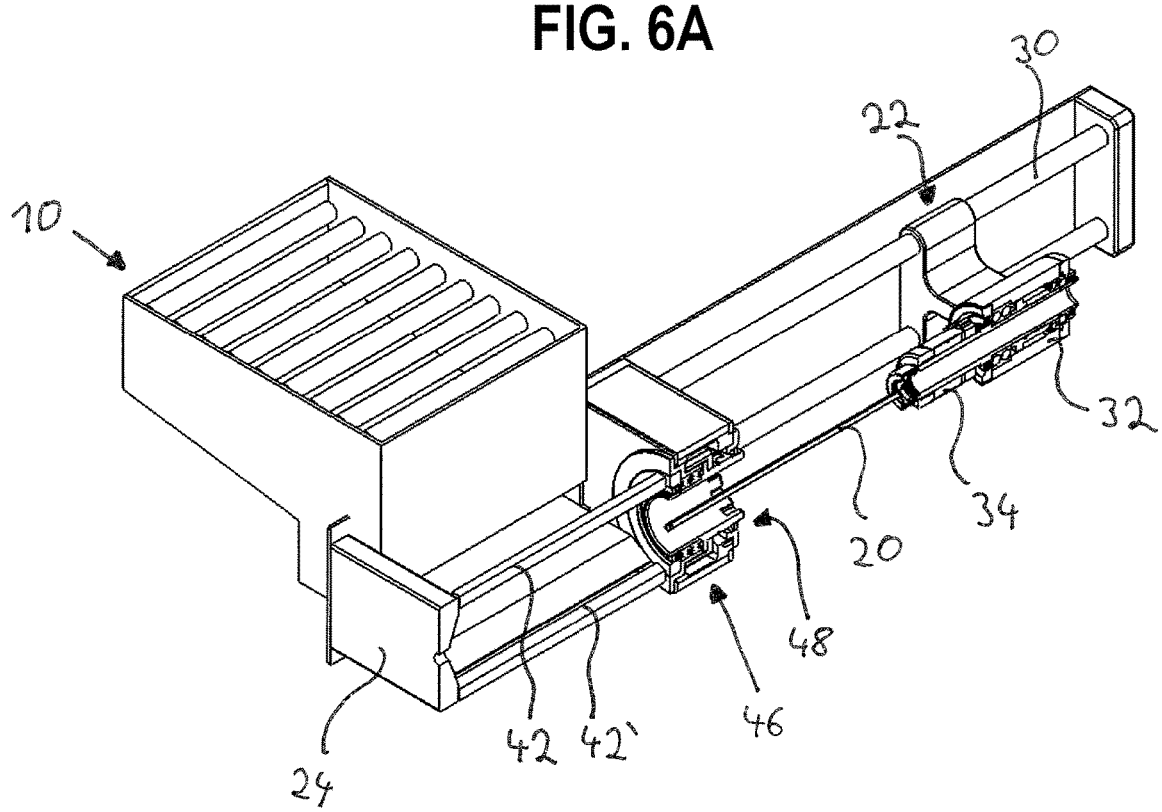
FIG. 6B shows a partially-sectioned top perspective view of the filling machine in the state of FIG. 6A.

FIGS. 6A and 6B firstly show a basic state in which the filling tube 20 is in a starting position and at any event has not yet been moved in the operating region of the gripping elements 42, 42'. The gripping elements 42, 42' are opened and a case 16 has already been fed thereto from the magazine 10. It can be seen from FIG. 6B that the filling tube 20 is firstly in a starting position and only extends into a region of the drive portion 46, but not into the region of the gripping elements 42, 42'.

Figure 7A:
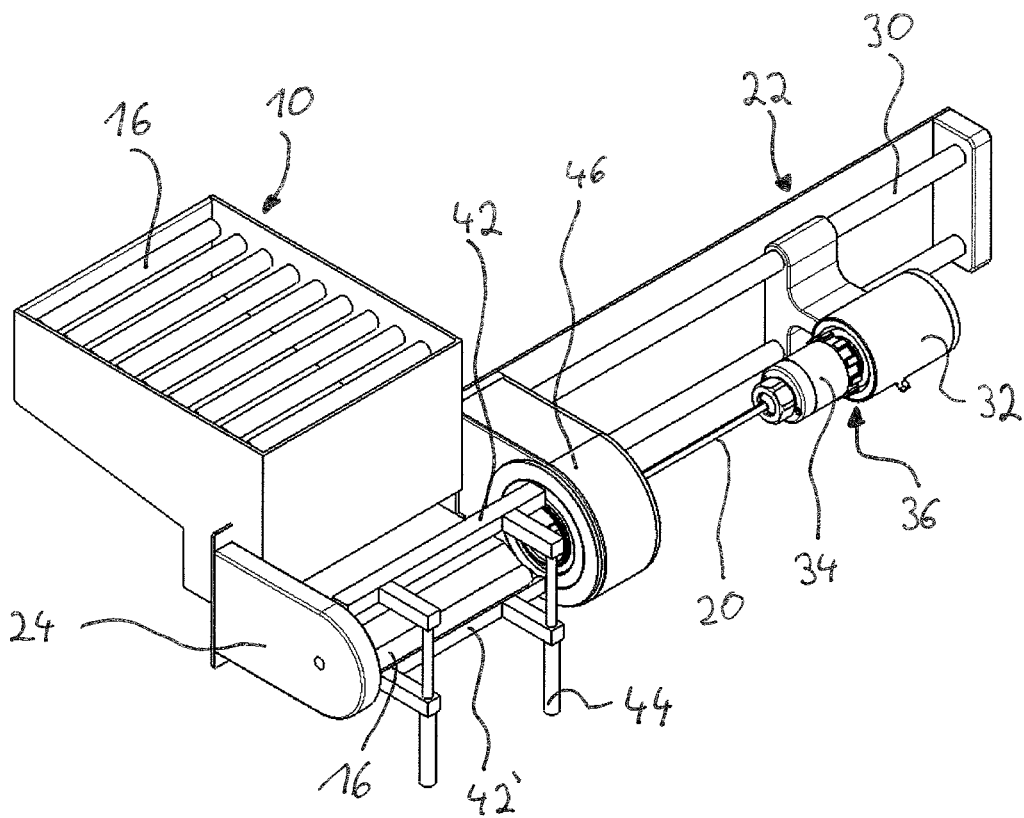
FIG. 7A shows a top perspective view of the filling machine of FIG. 6A in a subsequent position, in accordance with another step of the method, specifically in which a case has been fed to the lower gripping element.
Figure 7B:
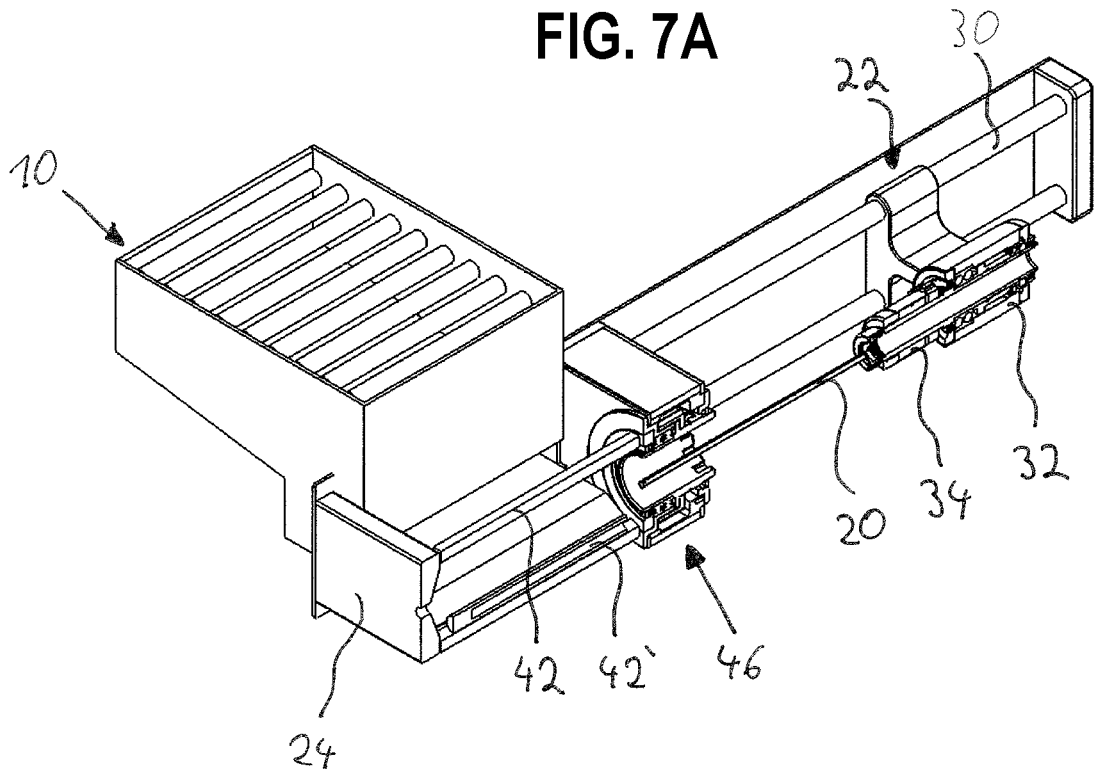
FIG. 7B shows a partially-sectioned top perspective view of the filling machine in the state of FIG. 7A.
Figure 8A:
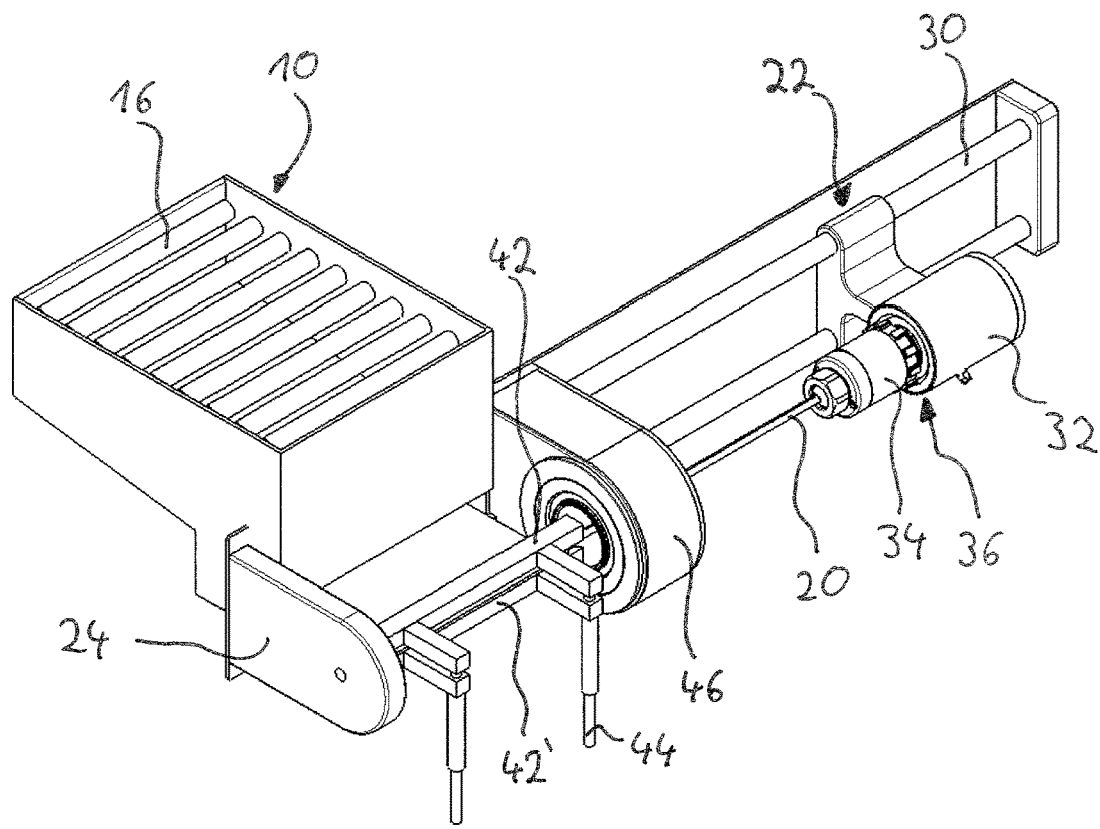
FIG. 8A shows a top perspective view of the filling machine of FIG. 7A in a subsequent position, in accordance with another step of the method, specifically in which the gripping elements are in a closed state.
Figure 8B:
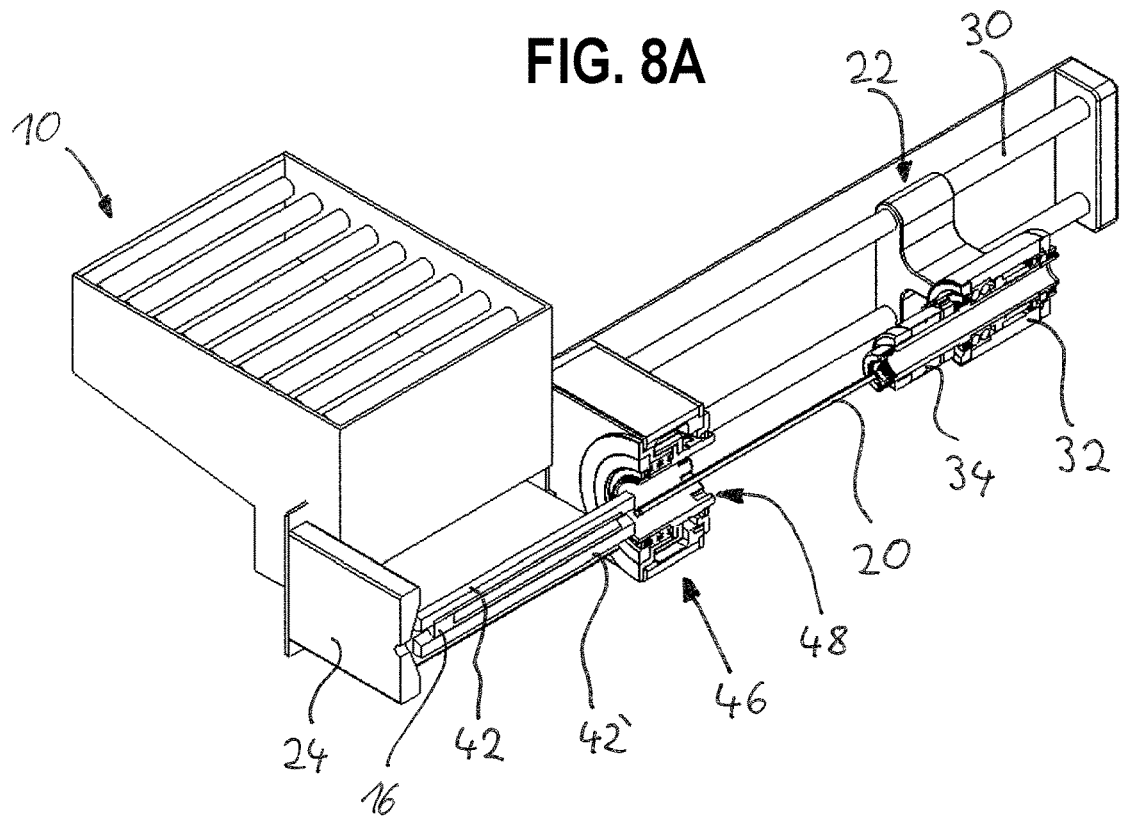
FIG. 8B shows a partially-sectioned top perspective view of the filling machine in the state of FIG. 8A.

In the state shown in FIGS. 7A and 7B a case 16 has now been fed to the lower gripping element 42'. The position of the filling tube 20 and thus the filling tube adjusting device 22 is initially unchanged. FIGS. 8A and 8B show an operating state in which the gripping elements 42, 42' are in direct contact with the case 16, and accordingly the gripping elements 42, 42' are in a closed state. That provides for centering of the case 16 relative to the filling tube 20. The position of the filling tube 20 however is still unchanged in relation to the position shown in FIGS. 7A and 7B.

Figure 9A:
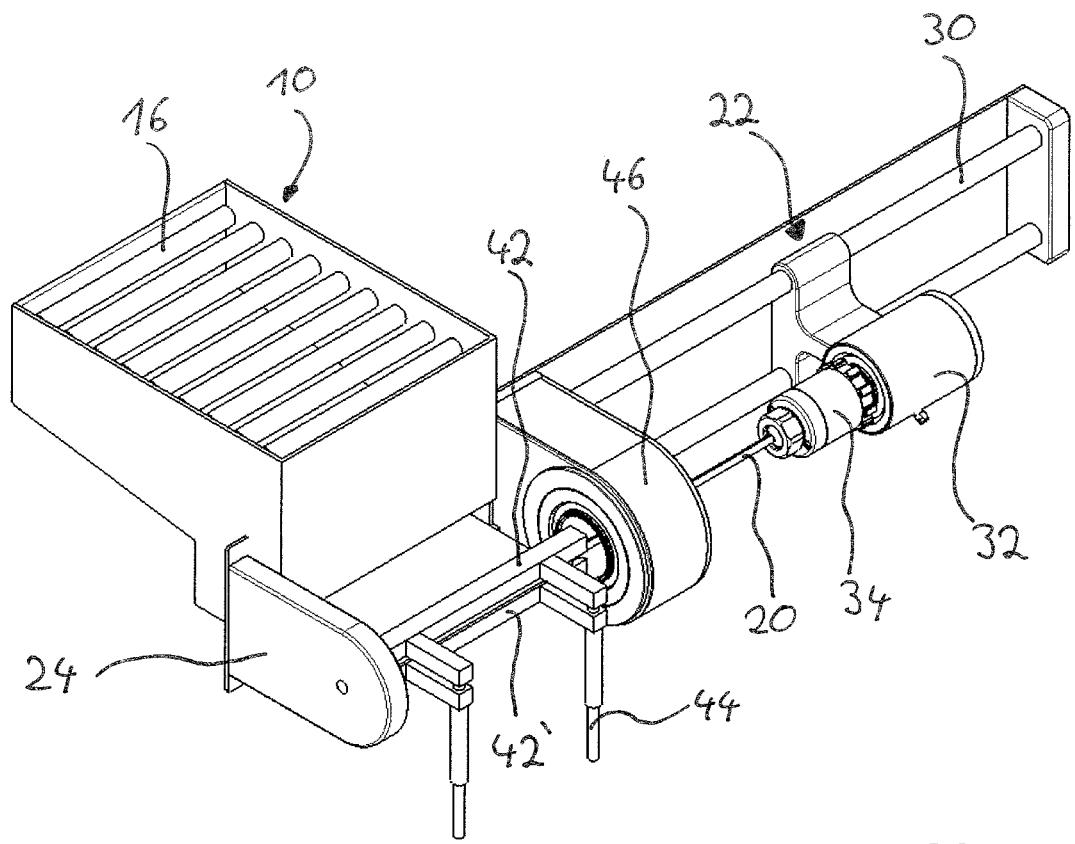
FIG. 9A shows a top perspective view of the filling machine of FIG. 8A in a subsequent position, in accordance with another step of the method, specifically in which the filling tube is moved axially in the direction of the case.
Figure 9B:
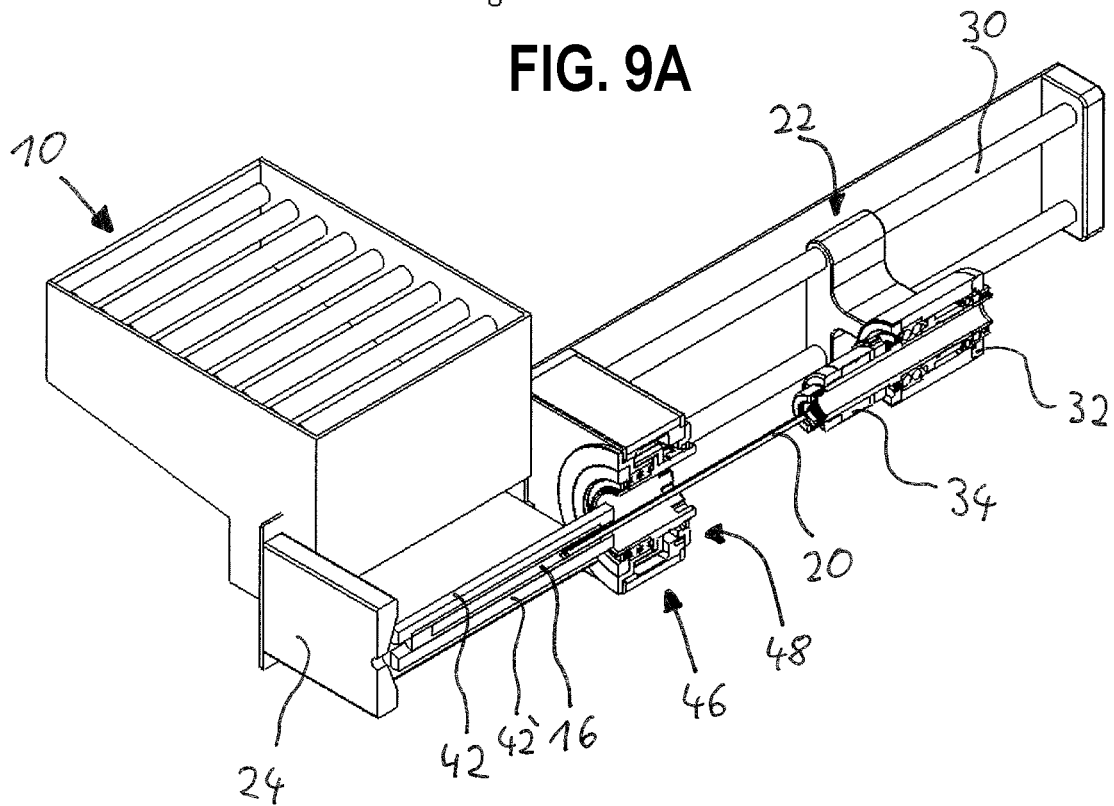
FIG. 9B shows a partially-sectioned top perspective view of the filling machine in the state of FIG. 9A.

FIGS. 9A and 9B show a state in which the gripping elements 42, 42' are still closed and the filling tube 20 has been moved axially in the direction of the case 16 by the filling tube adjusting device 22. As the case 16 is held by the gripping elements 42, 42' the result of an axial movement of the filling tube 20 in the direction of the case 16 is that the filling tube 20 is moved into a case interior and accordingly the case 16 is partially fitted on to the filling tube 20.

Figure 10A:
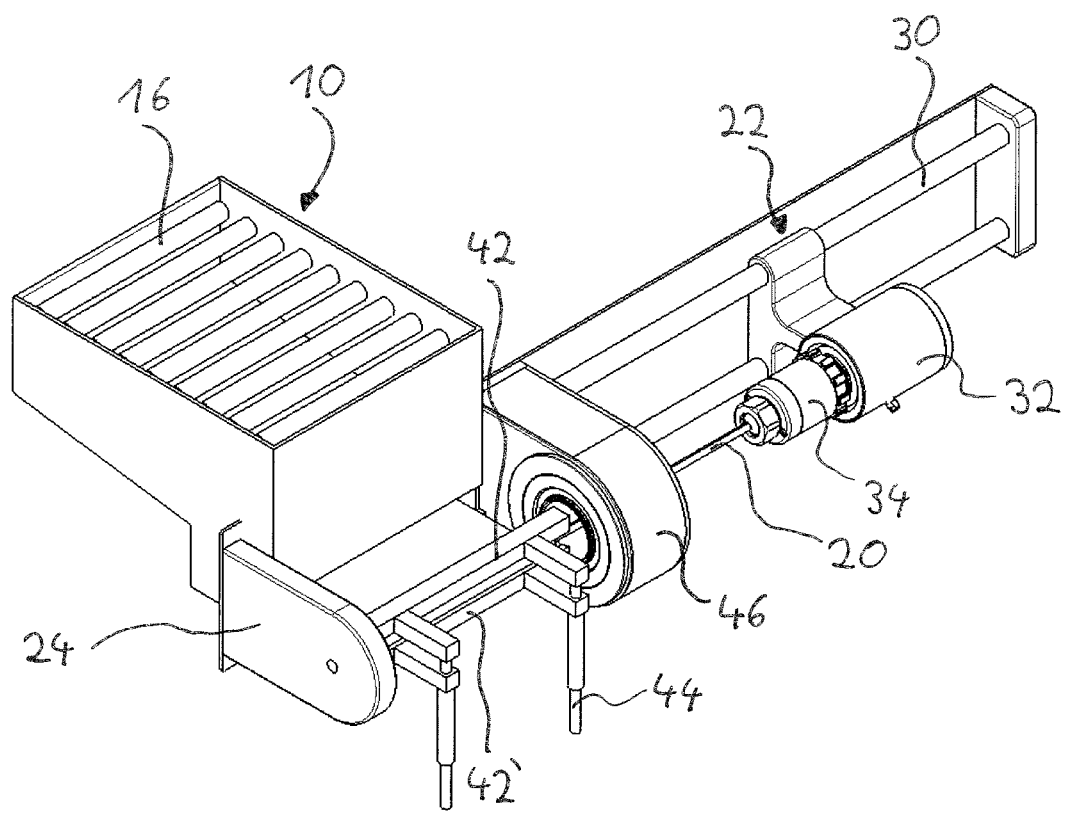
FIG. 10A shows a top perspective view of the filling machine of FIG. 9A in a subsequent position, in accordance with another step of the method, specifically in which the gripping elements are slightly opened.
Figure 10B:
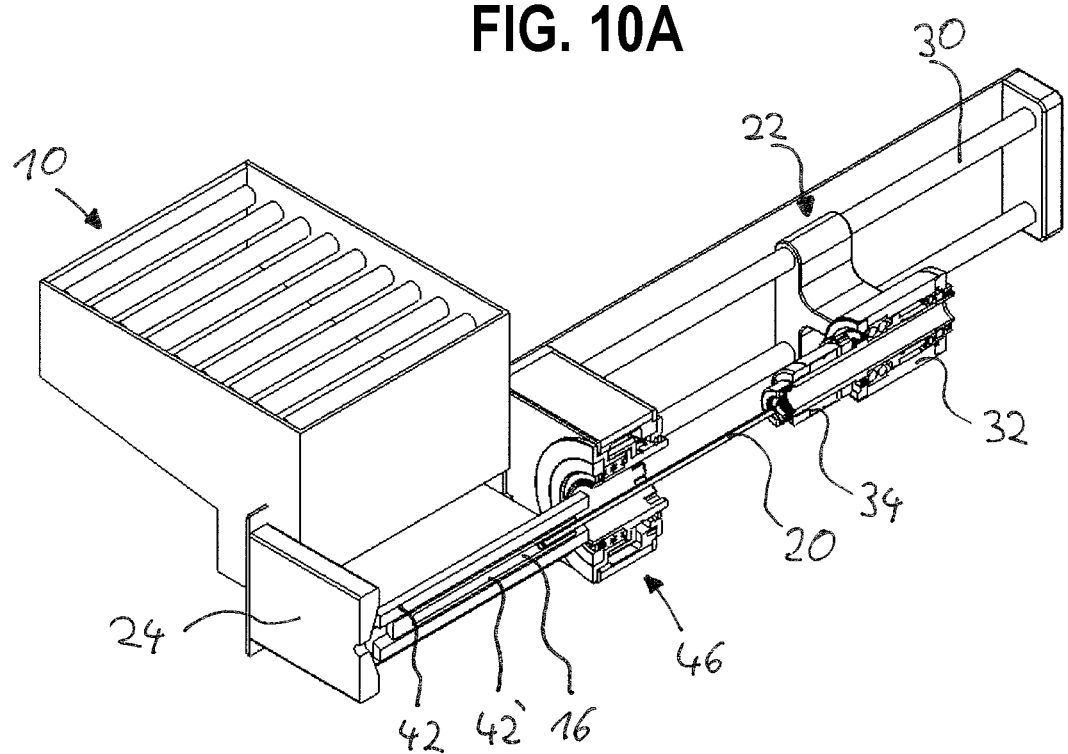
FIG. 10B shows a partially-sectioned top perspective view of the filling machine in the state of FIG. 10A.
Figure 11A:
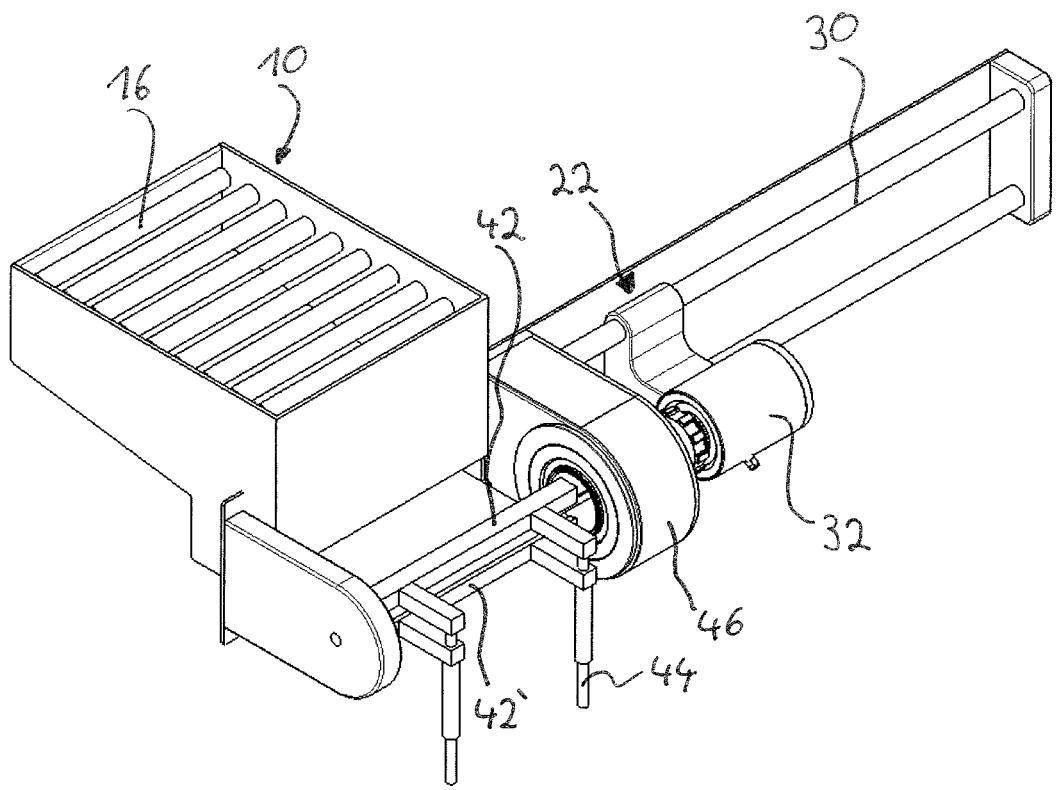
FIG. 11A shows a top perspective view of the filling machine of FIG. 10A in a subsequent position, in accordance with another step of the method, specifically in which the filling tube is moved axially in the direction of the casing brake.
Figure 11B:
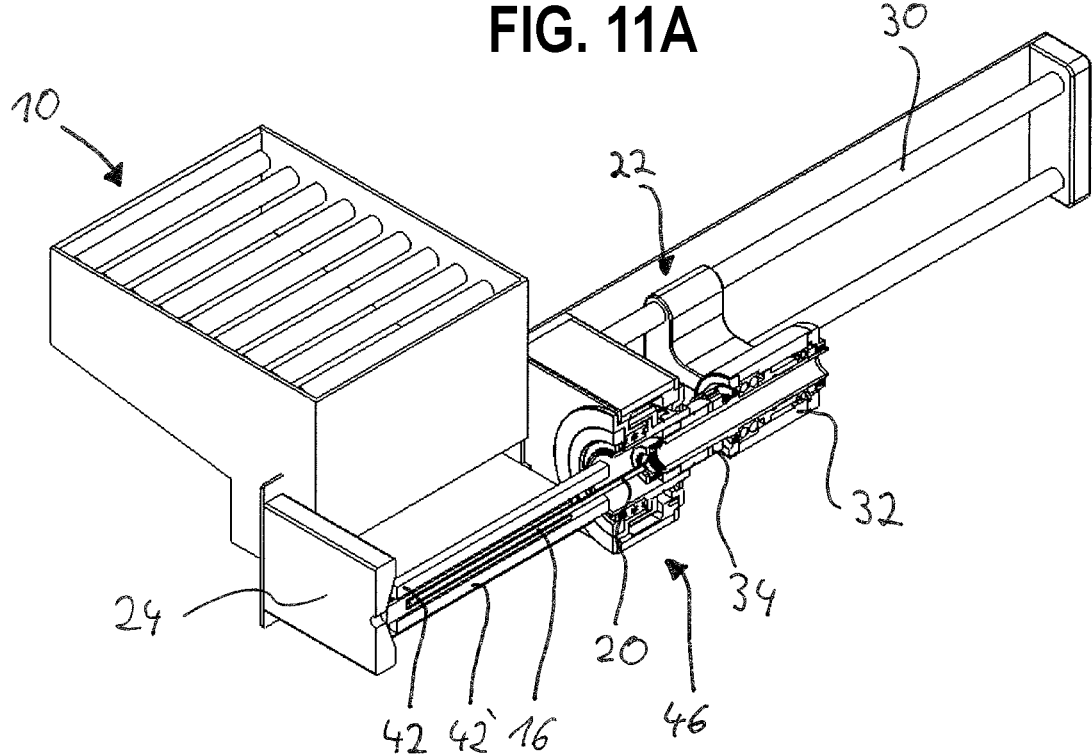
FIG. 11B shows a partially-sectioned top perspective view of the filling machine in the state of FIG. 11A.

In the state shown in FIGS. 10A and 10B the gripping elements 42, 42' have now been slightly opened. In that situation the case 16 which is partially fitted on to the filling tube 20 is guided by the gripping elements 42, 42', but is moveable axially in relation to the gripping elements 42, 42'. FIGS. 11A and 11B, with the gripping elements 42, 42' still slightly opened, shows a state in which the filling tube 20 has been moved axially in the direction of the casing brake 24 by the filling tube adjusting device 22. In a first range of movement the axial movement of the filling tube 20 in the direction of the casing brake 24 provides that the case 16 retains its position on the filling tube 20, more specifically until the end of the case 16, that is towards the casing brake 24, comes into contact with the casing brake 24. Further displacement of the filling tube 20 in the direction of the casing brake 24 then has the result that the filling tube 20 is further pushed into the interior of the case 16.

Figure 12A:
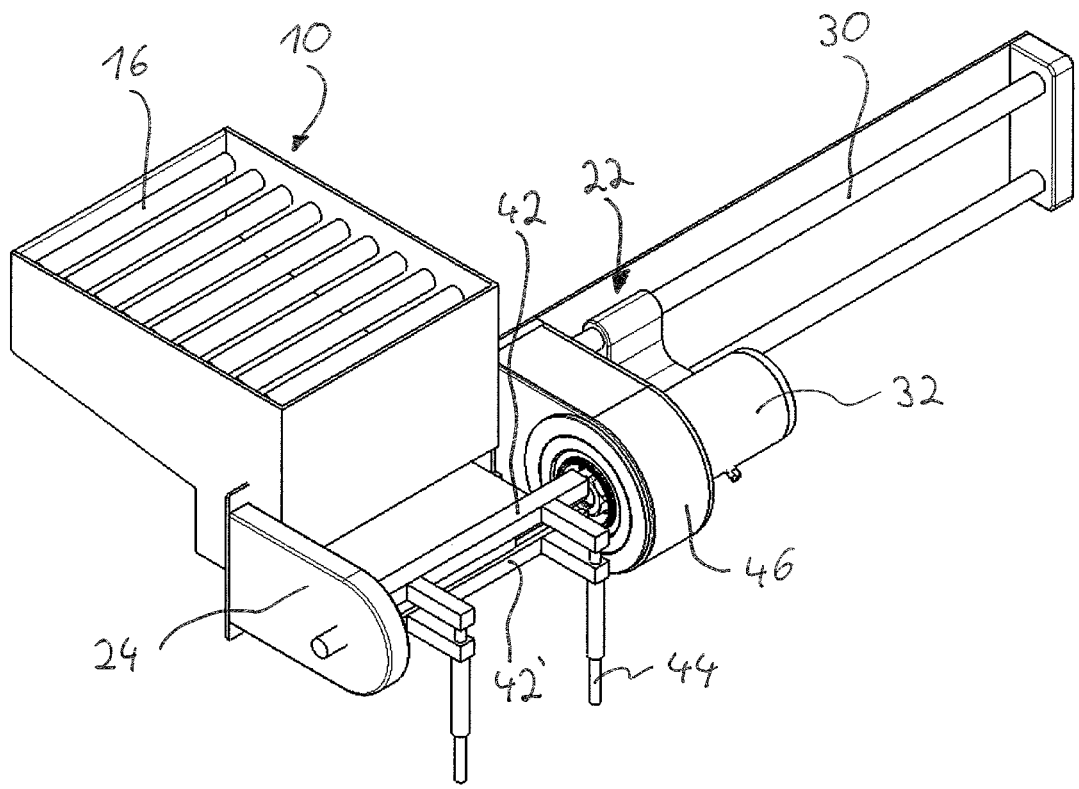
FIG. 12A shows a top perspective view of the filling machine of FIG. 11A in a subsequent position, in accordance with another step of the method, specifically in which the case is about to be filled.
Figure 12B:
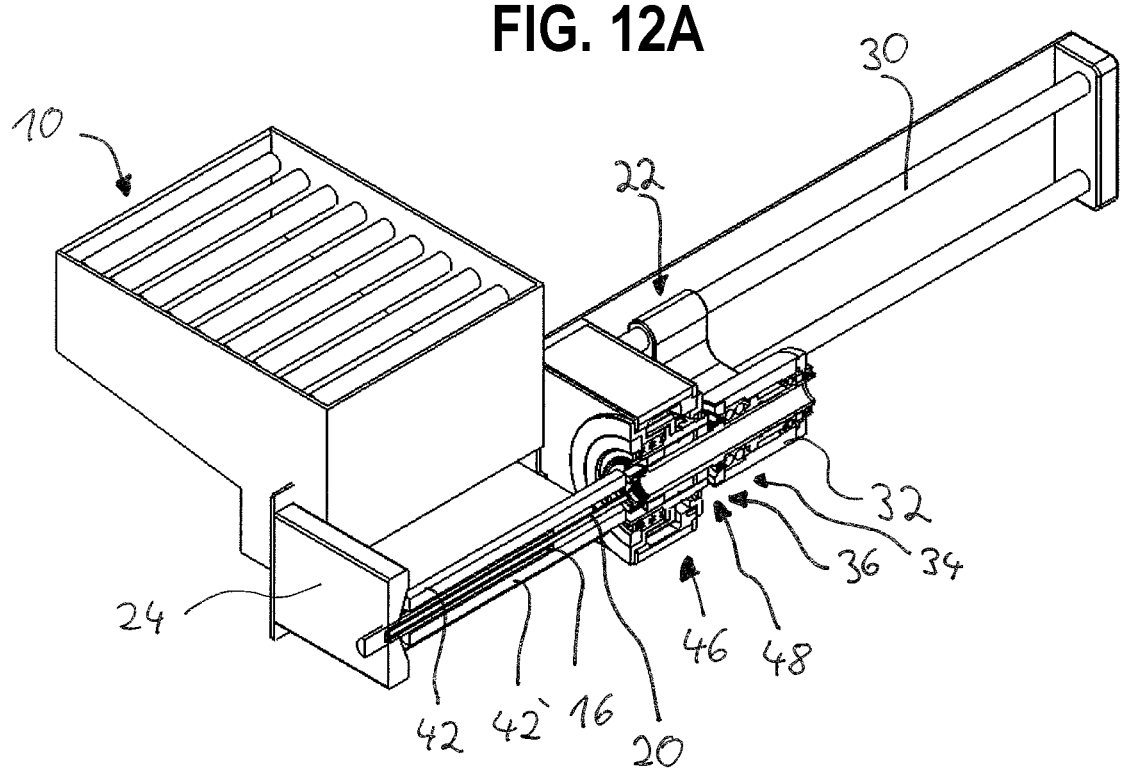
FIG. 12B shows a partially-sectioned top perspective view of the filling machine in the state of FIG. 12A.

FIGS. 12A and 12B show that operating state immediately prior to filling of the case 16. The filling tube 20 has now been moved into the filling position by the filling tube adjusting device 22. The case 16 is now in direct contact with the casing brake 24. In addition the second coupling portion 48 of the drive portion 46 is now also in contact with the first coupling portion 36 of the filling tube receiving means 34. Thus optionally, for example by way of a positively locking or force-locking connection a torque can be applied by the drive portion 46 to the filling tube receiving means 34 and thus the filling tube 20 and the filling tube 20 can be caused to rotate.

Figure 13A:
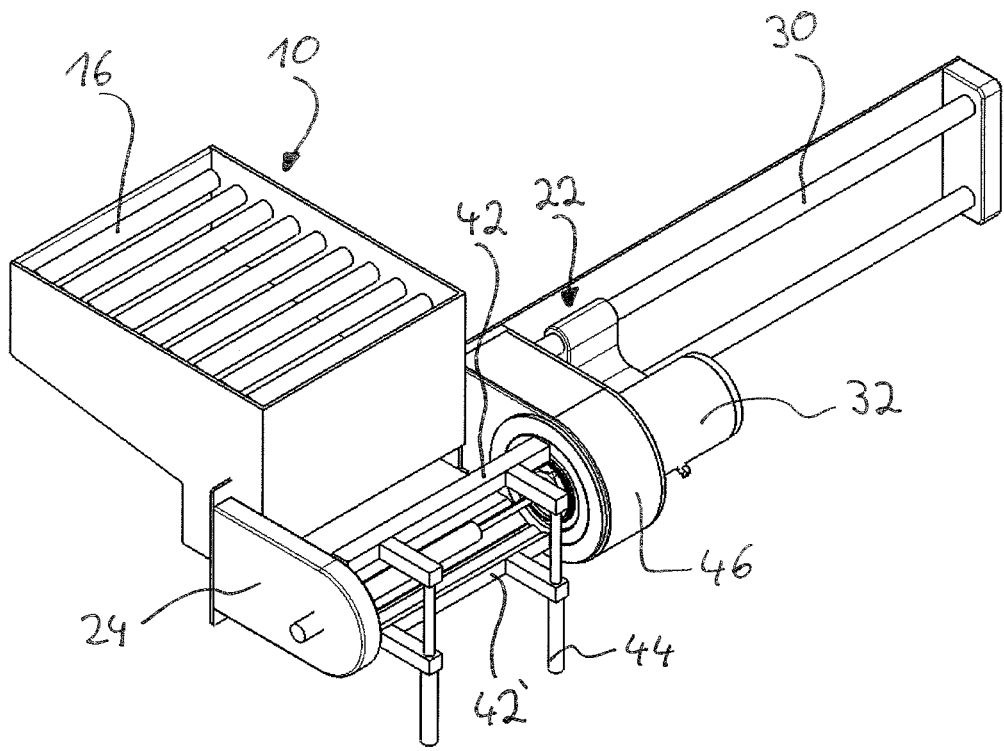
FIG. 13A shows a top perspective view of the filling machine of FIG. 12A in a subsequent position, in accordance with another step of the method, specifically in which the gripping elements are opened and the case is filled.
Figure 13B:
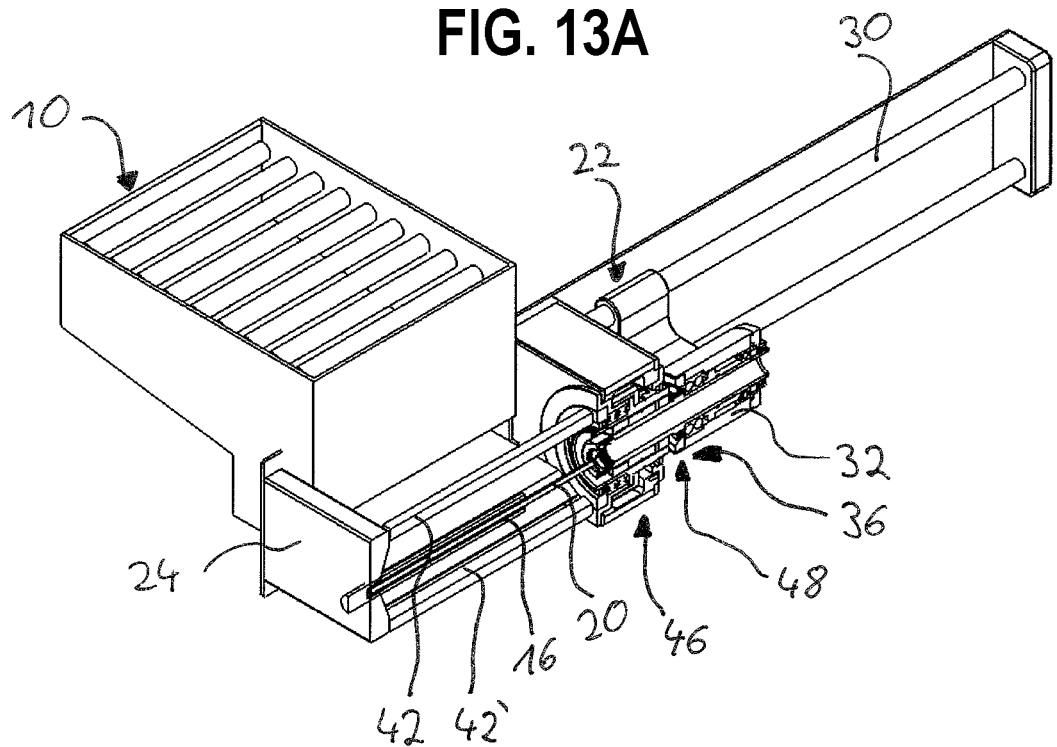
FIG. 13B shows a partially-sectioned top perspective view of the filling machine in the state of FIG. 13A.

In the state shown in FIGS. 13A and 13B the gripping elements 42, 42' are in an opened state and permit free rotatability of the filling tube 20 and the case 16. The case 16 can now be completely filled and a fresh case 16 can be deposited on or fed to the lower gripping element 42' after the filling tube adjusting device 22 has been moved into its starting position. The method can then begin afresh starting from the state shown in FIGS. 6A and 6B.

The embodiments described above are only descriptions of preferred embodiments of the present invention, and do not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

LIST OF REFERENCES USED 2 attachment
4 machine
6 filling apparatus
8 filling tube equipping apparatus
10 case magazine
12 case gripping device 14 conveyor device
16 case
18 feed device
20 filling tube
22 filling tube adjusting device
24 casing brake
28, 28' conveyor element
30 guide
32 main body
34 filling tube receiving means
36 first coupling portion
38 moveable line portion
40 extrusion head
42 upper gripping element
42' lower gripping element
44 gripper linkage
46 drive portion
48 second coupling portion
50 filling hopper
52 detecting device
54 control device

What is claimed is:

1. A method of equipping at least one filling tube of an apparatus for filling tubular cases with a gathered tubular case, the method comprising:
    opening at least one gripping element of a case gripping device,
    feeding a gathered tubular case into a region of the at least one gripping element of the case gripping device,
    closing at least one gripping element for fixing and axially centering the case along a longitudinal axis of a filling tube,
    moving at least one of the filling tube and the gripping device relative to each other towards each other for introducing the filling tube into an interior space of the case,
    partially opening at least one gripping element, and
    moving at least one of the filling tube and the gripping device relative to each other towards each other, wherein the filling tube entrains the case in a direction of movement of the filling tube and the case is guided by the gripping elements.

2. The method of claim 1, wherein an introducing of the filling tube into the case interior is performed until the filling tube comes into contact with an end portion of the case.

3. The method of claim 1, wherein the filling tube is partially introduced into the case interior.

4. The method of claim 1, further comprising:
    axially moving at least one of the filling tube and a casing brake into a filling position in which an end portion of the case comes into contact with the casing brake.

5. The method of claim 4, further comprising:
    opening at least one gripping element, in a continuous or step-wise manner, and
    filling the case with a pasty material.

6. The method of claim 5, further comprising at least one of the following steps:
    ascertaining a diameter of the case, and
    detecting incorrect loading of the gripping elements.

7. The method of claim 6, further comprising:
    further following movement of the case in a direction of the casing brake during filling of the case.

8. The method of claim 1, further comprising:
    opening at least one gripping element, in a continuous or step-wise manner, and
    filling the case with a pasty material.

9. The method of claim 1, further comprising at least one of the following steps:
    ascertaining a diameter of the case, and
    detecting incorrect loading of the gripping elements.

10. The method of claim 1, further comprising:
    further following movement of the case in a direction of the casing brake during filling of the case.

11. An apparatus for filling tubular cases, the apparatus comprising:
    a feed device for feeding a gathered tubular case to a case gripping device,
    a case gripping device having gripping elements which are moveable relative to each other for gripping and orienting a gathered tubular case relative to a centering axis,
    a filling tube adapted to receive the gathered tubular case, for delivery of a pasty material, wherein at least one of the filling tube and the case gripping device are arranged axially moveably relative to each other, and
    a control device that carries out the following steps:
    moving at least one of the filling tube and the gripping device relative to each other towards each other for introducing the filling tube into an interior space of the case,
    partially opening at least one gripping element, and
    relatively moving at least one of the filling tube and the gripping device towards each other, wherein the filling tube entrains the case in a direction of movement of the filling tube and the case is guided by the gripping elements.

12. The apparatus of claim 11, further comprising:
    a detecting device for detecting at least one of: a position of at least one of the gripping elements, an axial position of the filling tube, and an axial position of the gripping device.

13. The apparatus of claim 12, wherein the detecting device has a force sensor for ascertaining forces occurring at the gripping elements and at the filling tube.

14. The apparatus of claim 13, wherein the control device is adapted to ascertain at least one of a diameter of the cases and incorrect loading of the gripping elements.

15. The apparatus of claim 14, further comprising:
    a casing brake.

16. The apparatus of claim 11, wherein the control device is adapted to ascertain at least one of a diameter of the cases and incorrect loading of the gripping elements.

17. The apparatus of claim 11, further comprising:
    a casing brake.

18. A system for filling gathered tubular cases, comprising:
    a filling machine for providing a pasty material for an apparatus for filling tubular cases, and
    the apparatus for filling tubular cases of claim 11.

* * * * *